W. ESTY.
Emery-Wheels.
No. 196,345. Patented Oct. 23, 1877.
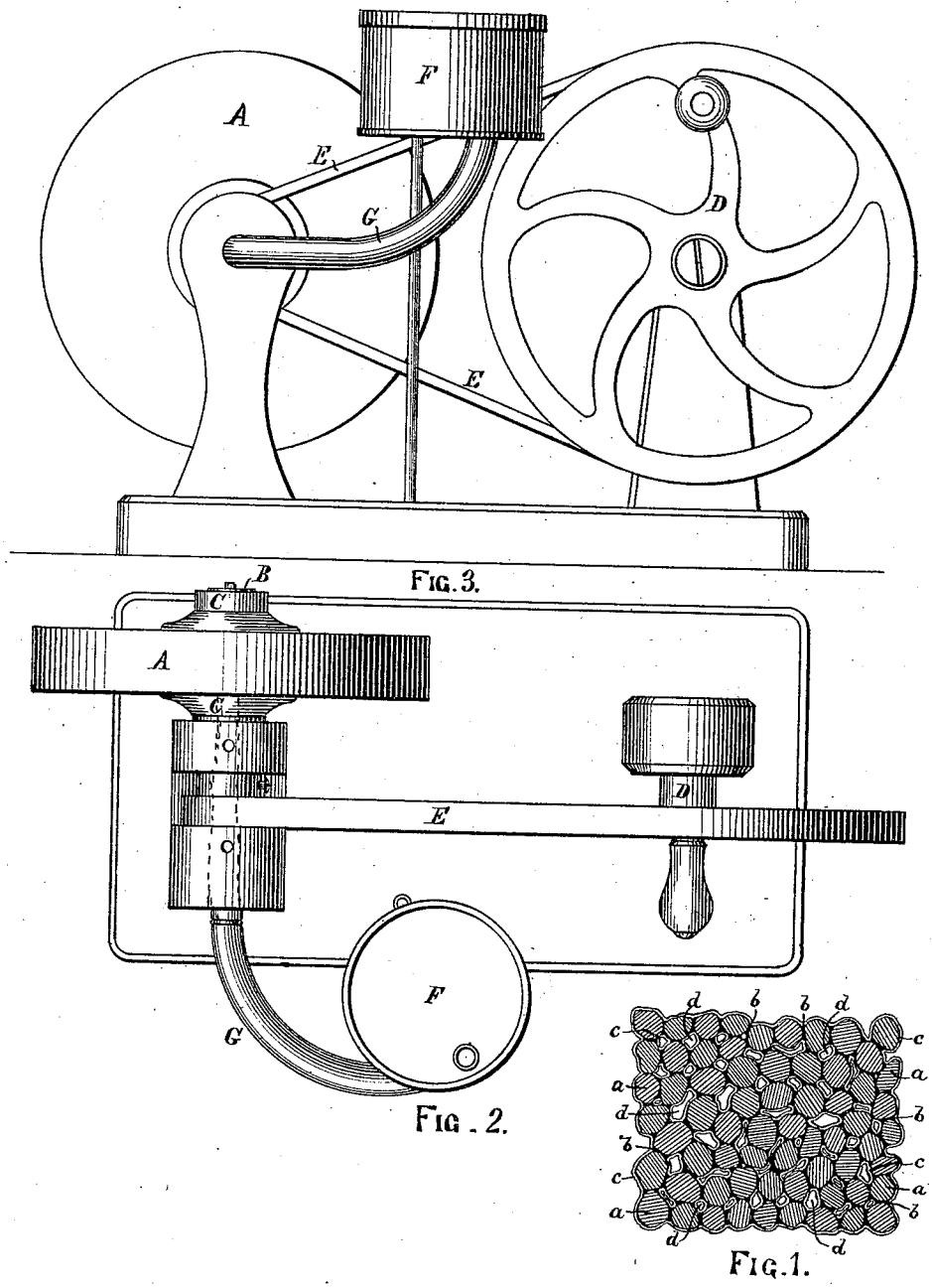
WITNESSES.
N. C. Lombard,
E. A. Hemmenway
INVENTOR.
William Esty

UNITED STATES PATENT OFFICE.

WILLIAM ESTY, OF ASHLAND, MASSACHUSETTS.

IMPROVEMENT IN EMERY-WHEELS.

Specification forming part of Letters Patent No. 196,345, dated October 23, 1877; application filed June 26, 1877.

*To all whom it may concern:*

Be it known that I, WILLIAM ESTY, of Ashland, in the county of Middlesex and State of Massachusetts, have invented certain new and useful Improvements in the Manufacture of Emery-Wheels, of which the following, taken in connection with the accompanying drawings, is a specification.

My invention relates to the manufacture and treatment of porous grinding-wheels; and has for its object the artificial production of strong porous grinding-wheels, adapted to have water applied to their outer peripheries by introducing it at the center of the wheels and forcing it outward through the pores of the stone by centrifugal action, as described in Letters Patent No. 164,692, granted to H. M. Putnam and myself, June 22, 1875, and the strengthening of porous natural grindstones, to adapt them to be run at high rates of speed without destroying their porous properties.

In carrying out my invention and applying it to the manufacture of emery-wheels, I first make a porous wheel by combining and mixing together grain or kernel emery, corundum, or other sharp, gritty substance, a quantity of the fine flour of the same material, and a quantity of granulated glass, molding the mass into the desired form, and then subjecting it to a low-red heat, substantially as described in Letters Patent No. 192,058, granted to me, June 19, 1877, for improved emery-wheel. I then fill the pores of the stone with a solution of asphaltum, rubber, shellac, or other gummy or cement-like substance, place the stone upon an arbor, and revolve it about its axis till a large part of said filling is thrown out of the stone by centrifugal force, care being taken to leave sufficient of the filling in the stone to thoroughly coat the walls of all of the cavities and fill the narrow or thin spaces at or around the points of contact of the kernels of emery or other gritty substance which furnishes the cutting properties of the stone, but not sufficient to fill the cavities to such an extent as to prevent water from being forced through the pores of the stone by centrifugal action. I then subject the stone to a heat of about 300°, to harden the filling or inner coating of gum or cement.

By this method of manufacturing emery or other artificial grinding-wheels a better wheel is produced, with much less loss from breakages in baking, than by the methods heretofore in use, for the reason that, in order to make a strong wheel, or one that could be run at a high rate of speed with safety, by any of the methods heretofore employed, the wheel had to be made practically solid or non-porous, and it had to be baked in a furnace with the temperature at a white heat, the result of which was that a great many wheels would break or crack in baking, and thereby become worthless.

By baking the stone at a low-red heat, instead of a white heat, the percentage of breakage is very much reduced—in fact, the cracking or breaking of the stone is almost entirely obviated; but, without further strengthening, the stone is not sufficiently strong to adapt it to be run at a high rate of speed without great danger of bursting; but when its cavities have been lined or coated with a solution of strengthening material, and rebaked at a comparatively low temperature, say, about 300°, as heretofore described, a very strong wheel is the result, capable of being run at a high rate of speed without breaking, and sufficiently porous to admit of water being fed through the stone from its center to its periphery by centrifugal action, as before described.

In the sheet of drawings shown, Figure 1 is a section of a small portion of an emery-wheel embodying my invention, magnified to about two hundred and fifty diameters. Figs. 2 and 3 are, respectively, a plan and an elevation of a machine illustrating the mode of applying the strengthening-coating to the walls of the cavities of the porous stone.

In Fig. 1, *a a* are kernels of emery, corundum, or other sharp, gritty substance cemented together by the fusion of broken glass and the flour of emery, corundum, or other gritty substance, as described in the Letters Patent before cited as having been granted to me, June 19, 1877, said cement being indicated by heavy black lines at *b b.* The strengthening coating of the cavities is indicated by a line, *c*, and the cavities by the spaces inclosed by said lines, as at *d d.*

In applying the strengthening material, the stone may be immersed in a solution thereof a sufficient length of time for the solution to permeate the whole mass, and then the stone may be mounted upon the hollow spindle B of the machine shown in the drawings, and made to revolve at a high rate of speed, till a portion of the solution contained in the pores of the stone is thrown off by centrifugal action, leaving the remainder of the solution adhering to the walls of the cavities.

I prefer, however, to place the emery-wheel A, after the first baking, upon the spindle B, the wheel being provided with the bushing C, constructed substantially as described in the patent to Putnam and myself, before cited, and force the solution of rubber, asphaltum, or shellac into and through the pores of the wheel, by causing it to revolve at a high rate of speed through the medium of the driving-pulley D and belt E, said solution having been previously placed in the tank F, from which it flows, through the pipe G and the hollow spindle B and bushing C, to the center of the wheel A, in an obvious manner.

Natural grindstones may be advantageously treated with the strengthening solution in the same manner as described for emery-wheels, when said stones are sufficiently porous to admit of water or other liquid being forced through the pores of the stone from its center to the circumference.

What I claim as new, and desire to secure by Letters Patent of the United States, is—

1. A porous grinding-wheel having the inner walls of its pores or cavities coated with a strengthening gum or cement applied thereto in solution after the wheel has been molded or shaped, and then hardened by heat, substantially as and for the purposes described.

2. The method of treating porous grinding-wheels, either natural or artificial, to strenghen them, as herein set forth, by filling the pores of said porous wheels with a strengthening gum or cement in solution, throwing out of said wheels a portion of said gum or cement by centrifugal action, and then baking the wheels to harden the gum or cement remaining in the cavities of the wheels, substantially as described.

3. The process of manufacturing artificial grinding-wheels, as set forth, by mixing emery, corundum, or other sharp, gritty substance in a granulated state, with a quantity of the fine flour or impalpable powder of the same material and a quantity of broken or granulated glass, molding the mixture to the desired form, baking the molded wheel at a low-red heat, cooling the wheel, then filling the pores of the wheel with a strengthening gum or cement in solution, throwing off a portion of said gum or cement by centrifugal action, and then baking the wheel again to harden the gum or cement, substantially as described.

Executed at Boston, Massachusetts, this 23d day of June, A. D. 1877.

WILLIAM ESTY.

Witnesses:
 N. C. LOMBARD,
 E. A. HEMMENWAY.